(12) United States Patent
Kanai

(10) Patent No.: US 9,739,662 B2
(45) Date of Patent: Aug. 22, 2017

(54) SPECTROMETRY DEVICE AND IMAGE FORMING APPARATUS

(71) Applicant: Seiko Epson Corporation, Tokyo (JP)

(72) Inventor: Masashi Kanai, Azumino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/079,421

(22) Filed: Mar. 24, 2016

(65) Prior Publication Data

US 2016/0282182 A1 Sep. 29, 2016

(30) Foreign Application Priority Data

Mar. 27, 2015 (JP) ................. 2015-067228

(51) Int. Cl.
| | |
|---|---|
| B41J 29/393 | (2006.01) |
| G01J 3/26 | (2006.01) |
| G01J 3/02 | (2006.01) |
| B41J 29/38 | (2006.01) |
| H04N 1/00 | (2006.01) |

(52) U.S. Cl.
CPC ............. *G01J 3/26* (2013.01); *B41J 29/38* (2013.01); *B41J 29/393* (2013.01); *G01J 3/0208* (2013.01); *H04N 1/00002* (2013.01)

(58) Field of Classification Search
CPC .. G01J 3/00; G01J 3/021; G01J 3/0248; G01J 3/0237; G01J 3/0262; G01J 3/26; G01J 3/2823; G01J 3/46; G01J 3/0208; G01J 3/0289; G01J 3/0297; B41J 29/393
See application file for complete search history.

(56) References Cited

U.S. PATENT DOCUMENTS

| | | | | |
|---|---|---|---|---|
| 5,894,353 A | * | 4/1999 | Hotta | ............ G01J 3/50 356/429 |
| 2005/0094160 A1 | | 5/2005 | Murai et al. | |
| 2006/0098183 A1 | * | 5/2006 | Sato | ............ G03F 1/44 355/71 |

(Continued)

FOREIGN PATENT DOCUMENTS

| | | |
|---|---|---|
| JP | H10-175330 A | 6/1998 |
| JP | 2005-091003 A | 4/2005 |

(Continued)

*Primary Examiner* — Geoffrey Mruk
*Assistant Examiner* — Scott A Richmond
(74) *Attorney, Agent, or Firm* — Harness, Dickey & Pierce, P.L.C.

(57) ABSTRACT

A printer includes a spectroscope including a light source, an integrator optical system that irradiates a predetermined area of irradiation of a medium with illumination light from the light source, a spectroscopy device on which light from a measurement target is incident and in which a wavelength-selective interference filter is disposed, and a light receiver that receives light emitted from the spectroscopy device. The integrator optical system irradiates with the illumination light the area of irradiation that includes a reference area of measurement and is larger than the reference area of measurement by at least an allowable amount of change in the distance between the medium and the spectroscope or more, the reference area of measurement in which the distance between the medium and the spectroscope is equal to a reference distance.

6 Claims, 10 Drawing Sheets

(56) References Cited

U.S. PATENT DOCUMENTS

| | | | | |
|---|---|---|---|---|
| 2008/0309921 | A1* | 12/2008 | Faase | G01J 3/02 |
| | | | | 356/73 |
| 2010/0231880 | A1* | 9/2010 | Kawabe | G03F 7/70075 |
| | | | | 355/67 |
| 2010/0296099 | A1* | 11/2010 | Van Brocklin | B41J 29/393 |
| | | | | 356/456 |
| 2013/0314682 | A1* | 11/2013 | Kemmoku | G03G 15/043 |
| | | | | 355/68 |

FOREIGN PATENT DOCUMENTS

| | | |
|---|---|---|
| JP | 2005-351638 A | 12/2005 |
| JP | 2010-210456 A | 9/2010 |

\* cited by examiner

SPECTROMETRY DEVICE AND IMAGE FORMING APPARATUS

BACKGROUND

1. Technical Field

The present invention relates to a spectrometry device and to an image forming apparatus.

2. Related Art

In the related art, there is known, in an image forming apparatus such as a color printer, a device that measures the color of a color image (color patch or the like) formed by the image forming apparatus and provides feedback of a color measurement result to the image forming apparatus in order to form the color image desired by a user with high accuracy (for example, refer to JP-A-2010-210456).

The device disclosed in JP-A-2010-210456 irradiates the medium with light by using a light source in which the central portion is bright while the peripheral portion is dark and receives reflected light by using a light receiver that is divided into a plurality of light receiving regions. Then, a distance signal corresponding to the distance between the medium and the colorimeter is calculated on the basis of a light reception signal of each light receiving element, and the amount of light received is corrected.

The device of the related art disclosed in JP-A-2010-210456 calculates the distance signal on the basis of the light reception signal from each light receiving element. As such, if the distance signal is calculated on the basis of the light reception signal, correction accuracy (color measurement accuracy) decreases because measurement noise affects the light reception signal, and a problem arises in that a spectrometry process (colorimetry process) cannot be performed with sufficient accuracy.

SUMMARY

An advantage of some aspects of the invention is to provide a spectrometry device and an image forming apparatus capable of performing a high accuracy spectrometry process.

According to an application example of the invention, there is provided a spectrometry device including a spectroscope that includes a light source, an integrator optical system that irradiates a predetermined irradiation area of a measurement target with illumination light from the light source, a spectroscopy element on which light from the measurement target is incident, and a light receiver that receives light which is spectroscopically analyzed by the spectroscopy element, in which the predetermined area of irradiation includes a reference area of measurement and is larger than the reference area of measurement by at least a dimension corresponding to an allowable amount of change in the distance between the measurement target and the spectroscope or more, the reference area of measurement being an area of measurement in which spectrometry using the spectroscope is performed when the distance between the measurement target and the spectroscope is equal to a reference distance.

In the application example, the area of illumination light from the light source is enlarged by the integrator optical system before irradiation and has an approximately uniform intensity distribution in the area of irradiation. The area of irradiation is set to be larger than the reference area of measurement, which is an area in which spectrometry is performed by the spectroscope when the distance between the measurement target and the spectroscope is equal to the reference distance, by a dimension corresponding to the allowable amount of change in the distance between the measurement target and the spectroscope or more. Therefore, even if the area of measurement is shifted from the reference area of measurement by a change in the distance between the measurement target and the spectroscope, the area of measurement is in the irradiation area of the illumination light when the change in the distance is within the allowable amount of change. In addition, since the integrator optical system performs irradiation in the area of irradiation with light having an approximately uniform intensity distribution, the light intensity distribution is approximately uniform in the area of measurement even if the area of measurement is moved into the area of irradiation by a change in the distance between the measurement target and the spectroscope. Therefore, a movement of the area of measurement does not change the light intensity distribution, and a decrease in accuracy can be suppressed. In a method that corrects a measured value by using a distance signal based on a detection signal from the light receiver, the reliability of the distance signal is decreased as a result of the influence of noise, and spectrometry accuracy (colorimetry accuracy) is decreased. Regarding this matter, the irradiation area of the illumination light is physically increased by the integrator optical system in the application example, and thus, reliability is increased compared with the correction method of the related art using the distance signal, and spectrometry accuracy can also be improved.

In the spectrometry device of the application example, it is preferable that the integrator optical system include a fly's eye lens.

In the application example, a fly's eye lens is included as the integrator optical system. Using the fly's eye lens allows the area of irradiation to be irradiated with light having an approximately uniform in-plane intensity by using a simple configuration and allows optical loss to be suppressed compared with a rod lens or the like.

In the spectrometry device of the application example, it is preferable that the spectroscopy element be a wavelength-selective Fabry-Pérot etalon element.

In the application example, a wavelength-selective Fabry-Pérot etalon element is used as the spectroscopy element. The etalon element includes a pair of reflecting films arranged to face each other. The spectral wavelength of light can be changed by controlling the dimension of the gap between the reflecting films. In addition, the etalon element has a low cost and small size compared with a case in which other spectroscopy elements such as an acousto-optic tunable filter (AOTF) and a liquid crystal tunable filter (LCTF) are used. Thus, the cost and the size of the spectrometry device are decreased.

The dimension of the gap between the pair of reflecting films in the etalon element is controlled by displacing one reflecting film toward the other reflecting film. The amount of bending tends to be larger in the peripheral region of the reflecting mirrors than in the central region of the reflecting mirrors, and the spectral wavelength is changed by the position of the reflecting mirrors. Generally, light emitted from the central region of the reflecting mirrors has a wavelength corresponding to the central wavelength, and the dimension of the gap between the reflecting mirrors is controlled so that the measured wavelength in spectrometry corresponds to the central wavelength.

If light having a non-uniform in-plane intensity distribution (for example, light having a high intensity in the central portion thereof and a low intensity in the peripheral portion thereof) is incident, light that is incident on the peripheral region of the reflecting films has a low intensity. Thus, the problem of transmitting light having a wavelength other than the measured wavelength can be prevented. However, if the area of measurement is moved due to a change in the distance between the measurement target and the spectroscope, light that is incident on the peripheral region of the reflecting films may have a high intensity, and light that is incident on the central region thereof may have a low intensity. In this case, the intensity of light having a wavelength other than the measured wavelength in spectrometry (e.g., light of a noise component) is increased, thereby decreasing measurement accuracy.

Regarding this matter, as described above, the area of irradiation is irradiated with light having an approximately uniform intensity distribution in the application example. Thus, even if the area of measurement is moved, reflective light having an approximately uniform intensity distribution is incident on the etalon element. Therefore, a decrease in measurement accuracy due to the non-uniformity of a light intensity can be suppressed.

It is preferable that the spectrometry device of the application example further include a light pencil diameter changer that changes the diameter of a light pencil of the illumination light with which the measurement target is irradiated, and that the diameter of the light pencil be changed according to the distance between the measurement target and the spectroscope.

In the application example, the light pencil diameter changer is disposed to adjust, in accordance with the distance between the measurement target and the spectroscope, the diameter of the light pencil of the illumination light with which the measurement target is irradiated.

As described above, irradiation with illumination light having an approximately uniform in-plane intensity distribution in the application example is performed in a larger area than the reference area of measurement. If the area of irradiation is excessively large, light that is reflected in a region other than the area of measurement is incident on the spectroscope and may be received by the light receiver as stray light, thereby decreasing measurement accuracy. Regarding this matter, in the application example, the area of irradiation can be controlled in accordance with a position to which the area of measurement is moved by controlling the diameter of the light pencil of the illumination light, and high accuracy spectrometry can be performed by reducing stray light.

According to another application example of the invention, there is provided an image forming apparatus that includes the spectrometry device, and an image forming unit that forms an image on an image formation target.

In the application example, a reference color image such as a color patch is formed by the image forming unit on the image formation target, after which high accuracy spectrometry can be performed on the formed reference color image by the spectrometry device. Thus, it is possible to determine with high accuracy whether the color of the reference color image formed is the same as the color that the image forming unit is instructed to form, and, if the colors are different, feedback can be provided to the image forming unit in accordance with a spectrometry result.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
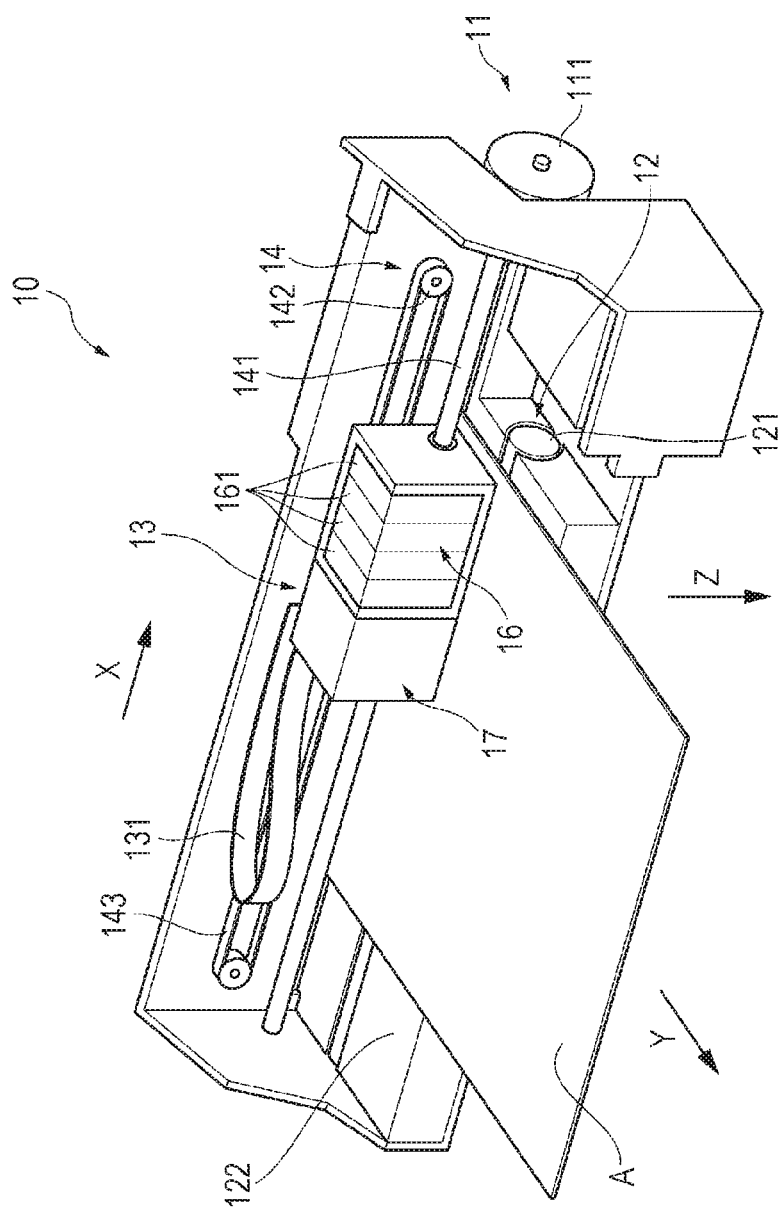
FIG. 1 is a perspective view illustrating an exterior configuration of a printer of a first embodiment according to the invention.
Figure 2:
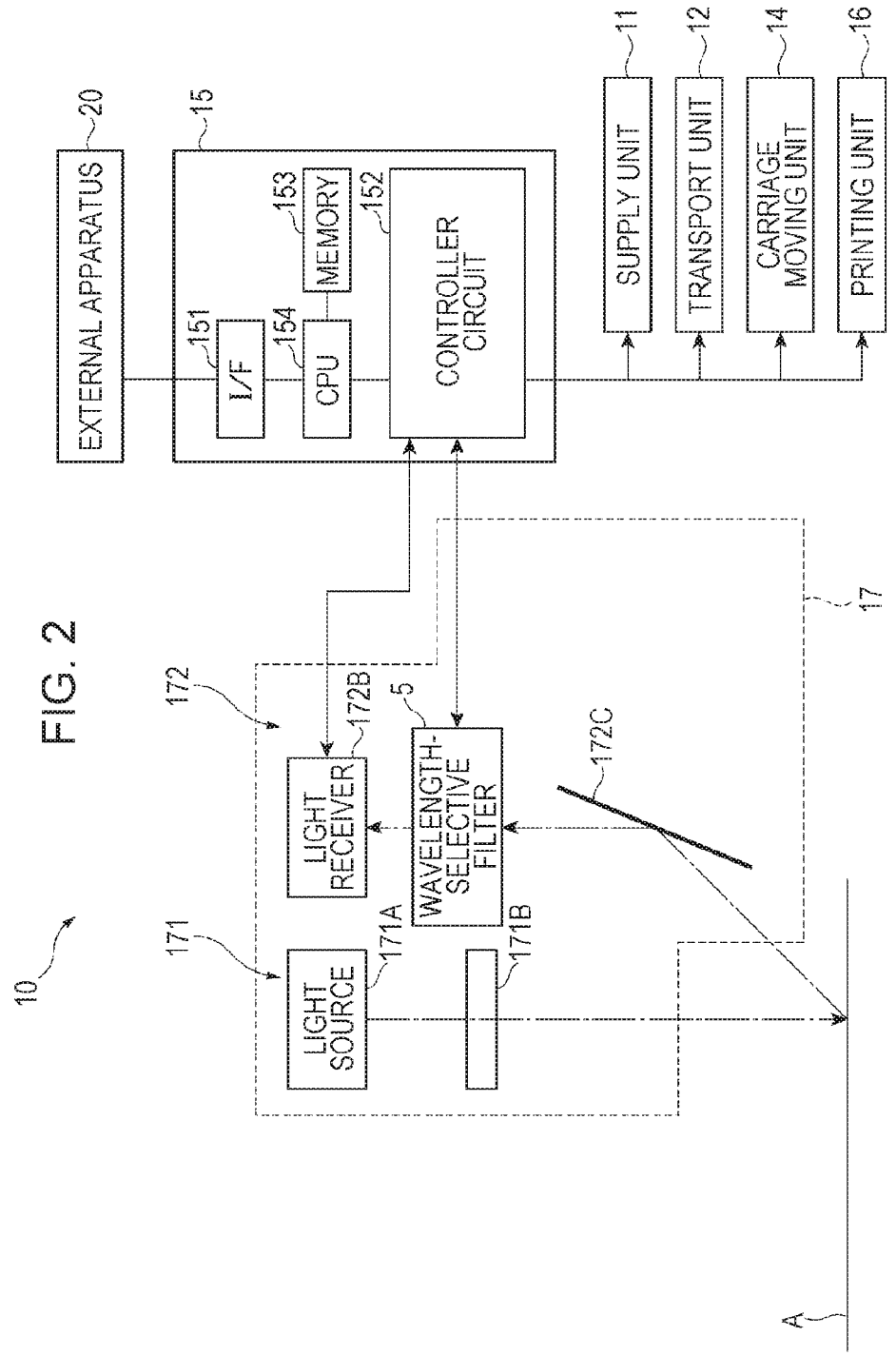
FIG. 2 is a block diagram illustrating a schematic configuration of the printer of the first embodiment.

Hereinafter, a first embodiment according to the invention will be described on the basis of the drawings. In the present embodiment, hereinafter, a printer 10 (ink jet printer) that includes a spectrometry device will be described as an example of an image forming apparatus of the invention.
Schematic Configuration of Printer FIG. 1 is a diagram illustrating an exterior configuration example of the printer 10 of the present embodiment. FIG. 2 is a block diagram illustrating a schematic configuration of the printer 10 of the present embodiment.

As illustrated in FIG. 1, the printer 10 includes a supply unit 11, a transport unit 12, a carriage 13, a carriage moving unit 14, and a control unit 15 (refer to FIG. 2). The printer 10 controls each of the units 11, 12, and 14 and the carriage 13 on the basis of print data that is input from an external apparatus 20 such as a personal computer and prints an image on a medium A (which constitutes a measurement target and an image formation target of the invention). In addition, the printer 10 of the present embodiment forms a color patch for measurement at a predetermined position on the medium A on the basis of preset calibration print data and performs spectrometry on the color patch. Accordingly, the printer 10 determines whether a color shift is present in the printed color by comparing an actual measured value from the color patch with the calibration print data and, if a color shift is present, corrects color on the basis of the actual measured value.

Hereinafter, each configuration of the printer 10 will be specifically described.

The supply unit 11 is a unit that supplies the image formation target medium A (illustrated as paper in the present embodiment) to the position of image formation. The supply unit 11, for example, includes a roll body 111 (refer to FIG. 1) on which the medium A is wound, a roll drive motor (not illustrated), and a roll drive wheel array (not illustrated). The roll drive motor is rotationally driven in response to an instruction from the control unit 15, and the torque of the roll drive motor is transmitted to the roll body 111 through the roll drive wheel array. Accordingly, the roll body 111 rotates and supplies the paper wound on the roll body 111 to the downstream side (+Y direction) in a Y direction (sub-scanning direction).

While the present embodiment illustrates supply of paper that is wound on the roll body 111, the present embodiment is not limited to this illustration. The medium A may be supplied by any method such as supplying a medium A such as paper stacked in a tray or the like, for example, one sheet at a time by using a roller or the like.

The transport unit 12 transports the medium A supplied from the supply unit 11 in the Y direction. The transport unit 12 is configured to include a transport roller 121, a driven roller (not illustrated) that is arranged to interpose the medium A between the transport roller 121 and the driven roller and driven by the transport roller 121, and a platen 122.

A drive force is applied to the transport roller 121 by a transport motor, not illustrated. When the transport motor is driven under control of the control unit 15, the transport roller 121 is rotationally driven by the torque of the transport motor and transports in the Y direction the medium A that is interposed between the transport roller 121 and the driven roller. The platen 122 that faces the carriage 13 is disposed on the downstream side (+Y side) of the transport roller 121 in the Y direction.

The carriage 13 includes a printing unit 16 that prints an image on the medium A and a spectroscope 17 that performs spectrometry at a predetermined position of measurement (in an area of measurement) on the medium A.

The carriage 13 is disposed to be movable by the carriage moving unit 14 in a main-scanning direction (X direction) that intersects the Y direction.

The carriage 13 is connected to the control unit 15 by a flexible circuit 131 and performs a printing process (process of forming an image on the medium A) with the printing unit 16 and a light intensity measuring process with the spectroscope 17 in response to an instruction from the control unit 15.

A detailed configuration of the carriage 13 will be described later.

The carriage moving unit 14 constitutes a moving unit of the invention and causes the carriage 13 to reciprocate in the X direction in response to an instruction from the control unit 15.

The carriage moving unit 14, for example, is configured to include a carriage guide shaft 141, a carriage motor 142, and a timing belt 143.

The carriage guide shaft 141 is arranged in the X direction and has both end portions fixed to, for example, the casing of the printer 10. The carriage motor 142 drives the timing belt 143. The timing belt 143 is supported in such a manner to be approximately parallel to the carriage guide shaft 141, and a part of the carriage 13 is fixed thereto. When the carriage motor 142 is driven in response to an instruction of the control unit 15, the timing belt 143 travels in forward and reverse directions, and the carriage 13 fixed to the timing belt 143 reciprocates while being guided by the carriage guide shaft 141.

Next, a configuration of the printing unit 16 and the spectroscope 17 disposed in the carriage 13 will be described.

Configuration of Printing Unit (Image Forming Unit)

The printing unit 16 is an image forming unit of the invention and forms an image on the medium A by discharging a plurality of inks separately onto the medium A from the part facing the medium A.

Ink cartridges 161 corresponding to ink of a plurality of colors are mounted on the printing unit 16 in a detachably attachable manner, and ink is supplied from each ink cartridge 161 to an ink tank (not illustrated) through a tube (not illustrated). In addition, nozzles (not illustrated) that discharge ink drops are disposed on the lower face of the printing unit 16 (at a position facing the medium A) in correspondence with each color. A piezoelectric element, for example, is arranged in each of these nozzles. Driving the piezoelectric element causes an ink drop supplied from the ink tank to be discharged onto the medium A, and a dot is thereby formed.

Configuration of Spectroscope

Figure 3:
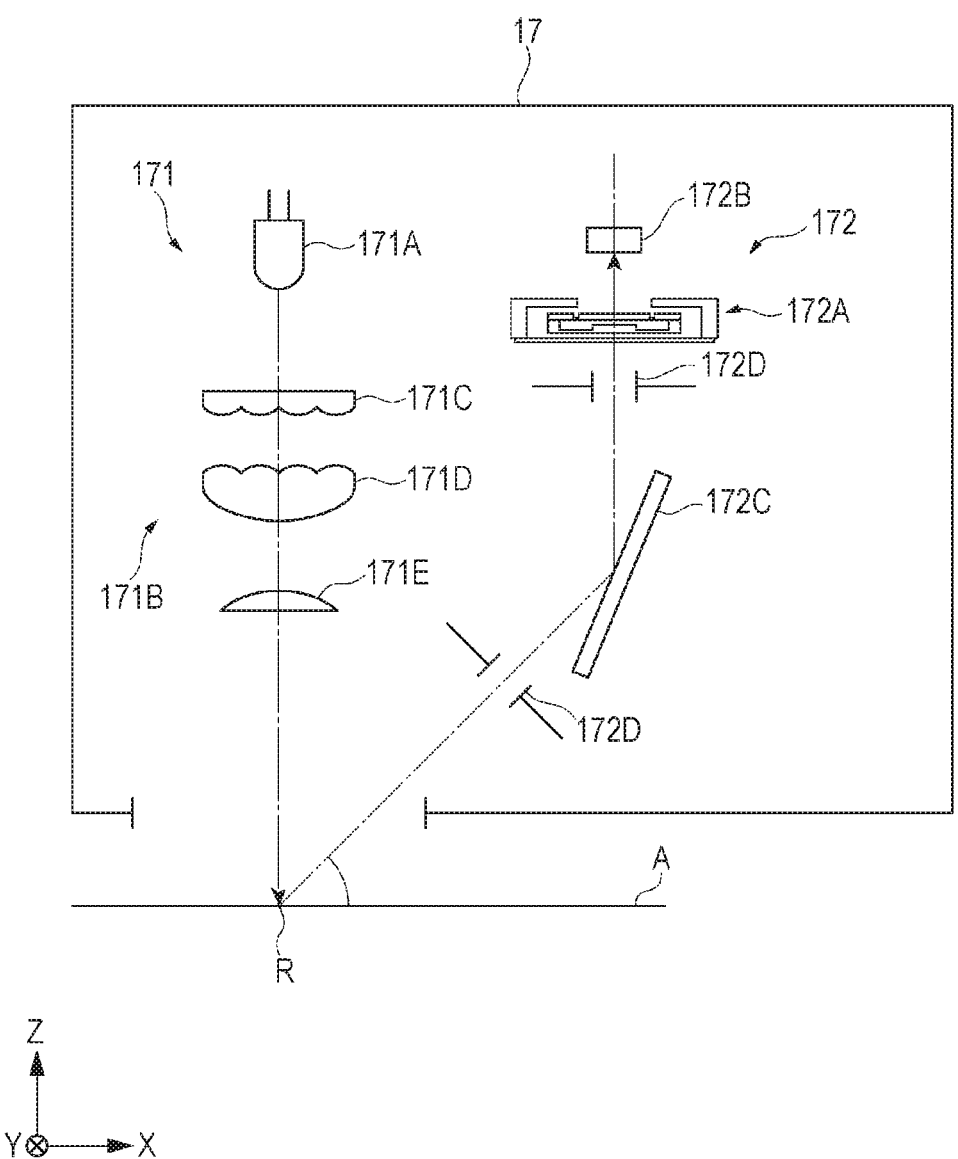
FIG. 3 is a diagram illustrating a schematic configuration of a spectroscope of the first embodiment.

FIG. 3 is a schematic diagram illustrating a configuration of the spectroscope 17.

The spectroscope 17 includes an illumination optical system 171 and a light receiving optical system 172 as illustrated in FIG. 3.

The spectroscope 17 irradiates the medium A with illumination light from the illumination optical system 171 and receives using the light receiving optical system 172 reflective light reflected by the medium A. A spectroscopy device 172A that is disposed in the light receiving optical system 172 can select a wavelength to be transmitted under control of the control unit 15 and can perform spectrometry at the position of measurement on the medium A by measuring the intensity of light of each visible light wavelength.

In the present embodiment, spectrometry is performed in accordance with a (0°: 45° x) geometrical optics condition defined by the color measurement standard (JIS Z 8722). That is, in the present embodiment, illumination light from the illumination optical system 171 is incident on the medium A in the direction of a line normal to the medium A (at an angle of incidence of 10° or less), and light reflected by the medium A at 45°±2° is received by the light receiving optical system 172.

While the present embodiment illustrates the illumination optical system 171 and the light receiving optical system 172 as being linearly configured in the X direction for convenience of description, the present embodiment is not limited to this illustration. The illumination optical system 171 and the light receiving optical system 172 may be linearly configured in the Y direction, or the illumination optical system 171 and the light receiving optical system 172 may be linearly configured in a direction intersecting the X and Y directions.

Configuration of Illumination Optical System

The illumination optical system 171 includes a light source 171A and an integrator optical system 171B as illustrated in FIG. 3.

In the illumination optical system 171, the light source 171A emits light, and the integrator optical system 171B ensures approximate uniformity of the in-plane intensity distribution of the light and irradiates the medium A with the light by enlarging the irradiation area of light.

The integrator optical system 171B is configured to include a pair of fly's eye lenses 171C and 171D and a condenser lens 171E that condenses light passing through the fly's eye lenses 171C and 171D.

The area of irradiation enlarged by the integrator optical system 171B will be described in detail later.

Configuration of Light Receiving Optical System

The light receiving optical system 172 includes the spectroscopy device 172A, a light receiver 172B, a reflecting mirror 172C, and a light-reception-side aperture 172D as illustrated in FIG. 3.

In the light receiving optical system 172, light that is reflected by the medium A is reflected by the reflecting mirror 172C toward the spectroscopy device 172A, and the light receiver 172B receives light of a predetermined wavelength that is spectroscopically analyzed by the spectroscopy device 172A. The light-reception-side aperture 172D, for example, is disposed as a pair, and the light receiver 172B receives light that passes through the light-reception-side aperture 172D. While FIG. 3 illustrates the light-reception-side aperture 172D as being disposed before and behind the reflecting mirror 172C, the present embodiment is not limited to this illustration. For example, the light-reception-side aperture 172D may be disposed before and behind the spectroscopy device 172A, between the spectroscopy device 172A and the reflecting mirror 172C, or between the spectroscopy device 172A and the light receiver 172B. Alternatively, the light-reception-side aperture 172D may be disposed in quantities of two before the reflecting mirror 172C.

As the light receiving optical system 172, a configuration in which disposed is a bandpass filter that cuts light other than visible light may be used. While the present embodiment illustrates a configuration in which reflective light is reflected by the reflecting mirror 172C toward the light receiver 172B, light that is incident on the light receiving optical system 172 may be directly incident on the spectroscopy device 172A without disposing the reflecting mirror 172C.

Configuration of Spectroscopy Device

Figure 4:
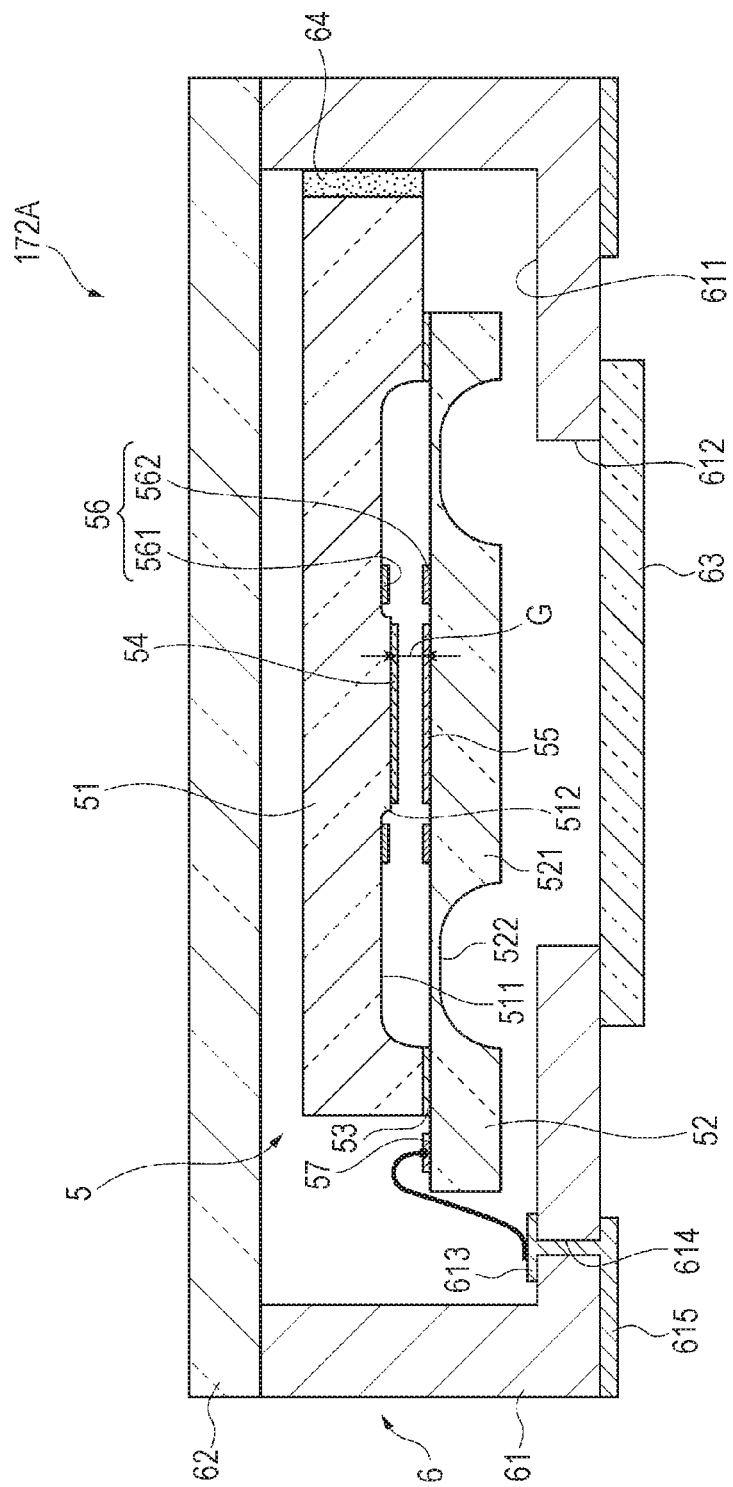
FIG. 4 is a sectional view schematically illustrating a spectroscopy device that includes a wavelength-selective interference filter (spectroscopy element) of the first embodiment.

FIG. 4 is a sectional view illustrating a schematic configuration of the spectroscopy device 172A.

The spectroscopy device 172A includes a casing 6 and a wavelength-selective interference filter 5 (spectroscopy element) that is accommodated in the casing 6.

Configuration of Wavelength-Selective Interference Filter

The wavelength-selective interference filter 5 is a wavelength-selective Fabry-Pérot etalon element and constitutes a spectroscopy element of the invention. While the present embodiment illustrates the wavelength-selective interference filter 5 as being arranged in the spectroscope 17 while being accommodated in the casing 6, the wavelength-selective interference filter 5, for example, may be configured to be directly arranged in the spectroscope 17.

The wavelength-selective interference filter 5 includes a light-transmissive fixed substrate 51 and a light-transmissive movable substrate 52 as illustrated in FIG. 4. The fixed substrate 51 and the movable substrate 52 are integrally configured by bonding using a bonding film 53. In the fixed substrate 51, disposed are a first groove portion 511 formed by etching and a second groove portion 512 having a smaller depth than the first groove portion 511. A fixed electrode 561 and a fixed reflecting film 54 are respectively disposed in the first groove portion 511 and in the second groove portion 512. The fixed reflecting film 54, for example, is configured of a metal film made of Ag or the like, an alloy film made of an Ag alloy or the like, a dielectric multilayer film made of a laminate of a high-refractive layer and a low-refractive layer, or a laminated body made of a laminate of a metal film (alloy film) and a dielectric multilayer film.

The movable substrate 52 includes a movable portion 521 and a holding portion 522 that is disposed outside of the movable portion 521 to hold the movable portion 521. On the face of the movable portion 521 facing the fixed substrate 51, disposed are a movable electrode 562 facing the fixed electrode 561 and a movable reflecting film 55 facing the fixed reflecting film 54. As the movable reflecting film 55, a reflecting film having the same configuration as the fixed reflecting film 54 can be used. The holding portion 522 is a diaphragm that surrounds the movable portion 521 and is formed to have a smaller thickness dimension than the movable portion 521.

The fixed electrode 561 and the movable electrode 562 constitute an electrostatic actuator 56 in the wavelength-selective interference filter 5. Applying a voltage to the electrostatic actuator 56 can change the dimension of a gap G between the fixed reflecting film 54 and the movable reflecting film 55. In the peripheral portion of the movable substrate 52 (region not facing the fixed substrate 51), disposed is a plurality of electrode pads 57 that is individually connected to the fixed electrode 561 and to the movable electrode 562.

Configuration of Casing

The casing 6 includes a base 61 and a glass substrate 62 as illustrated in FIG. 4. The base 61 and the glass substrate 62 are bonded by, for example, low melting point glass bonding to form an accommodative space therein, and the wavelength-selective interference filter 5 is accommodated in the accommodative space.

The base 61 is configured of, for example, a laminate of thin ceramic plates and includes a recessed portion 611 that can accommodate the wavelength-selective interference filter 5. The wavelength-selective interference filter 5 is fixed to, for example, a side face of the recessed portion 611 of the base 61 by a fixing material 64. A light pass hole 612 is disposed on the bottom face of the recessed portion 611 of the base 61, and a cover glass 63 is bonded to the bottom face cover the light pass hole 612.

An inside terminal unit 613 is disposed in the base and is connected to the electrode pad 57 of the wavelength-selective interference filter 5. The inside terminal unit 613 is connected through a conductive hole 614 to an outside terminal unit 615 that is disposed outside of the base 61. The outside terminal unit 615 is electrically connected to the control unit 15.

Configuration of Light Receiver

Returning to FIG. 3, the light receiver 172B is arranged on the optical axis of the wavelength-selective interference filter 5 (straight line passing through the central points of the reflecting films 54 and 55), receives in a light receiving region light that is transmitted through the wavelength-selective interference filter 5, and outputs a detection signal (current value) that corresponds to the intensity of light received. The detection signal output by the light receiver 172B is input into the control unit 15 through an I-V converter (not illustrated), an amplifier (not illustrated), and an AD converter (not illustrated).

Configuration of Control Unit

The control unit 15 is configured to include an I/F 151, a unit controller circuit 152, a memory 153, and a central processing unit (CPU) 154 as illustrated in FIG. 2.

The I/F 151 inputs into the CPU 154 the print data that is input from the external apparatus 20.

The unit controller circuit 152 includes a controller circuit that controls each of the supply unit 11, the transport unit 12, the printing unit 16, the light source 171A, the wavelength-selective interference filter 5, the light receiver 172B, and the carriage moving unit 14 and controls operation of each unit in response to an instruction signal from the CPU 154.

It is also possible that a controller circuit of each unit is disposed separately from the control unit 15 and is connected to the control unit 15.

The memory 153 stores various programs and various data that control operation of the printer 10.

Various data is exemplified by, for example, V-λ data that represents the wavelength of light transmitted through the wavelength-selective interference filter 5 with respect to the voltage applied to the electrostatic actuator when the wavelength-selective interference filter 5 is controlled and printing profile data that stores the amount of each ink to be discharged with respect to color data which is included as the print data. In addition, the memory 153 may store light emitting characteristics of the light source 171A with respect to each wavelength, light receiving characteristics (light reception sensitivity characteristics) of the light receiver 172B with respect to each wavelength, and the like.

Figure 5:
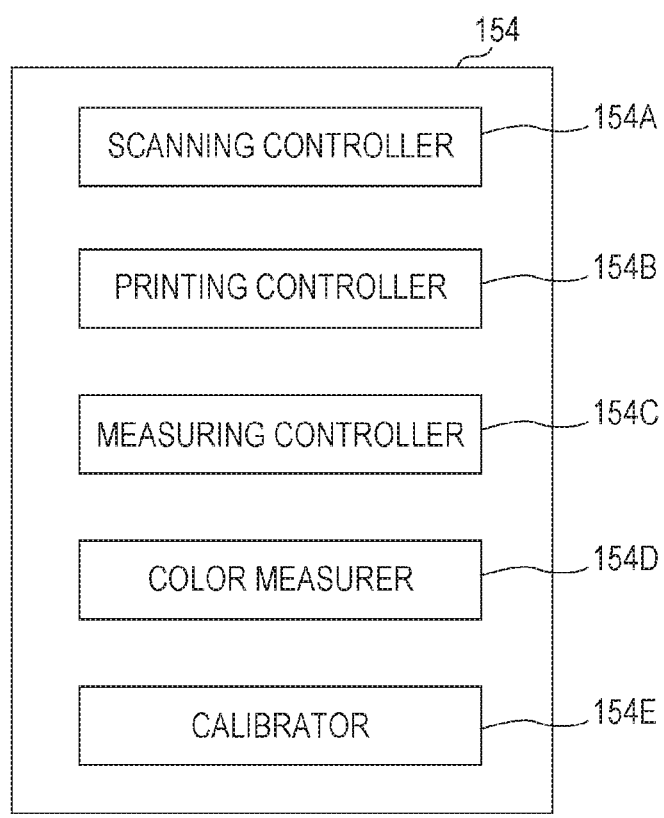
FIG. 5 is a block diagram illustrating a functional configuration of a CPU in a control unit of the printer of the first embodiment.

FIG. 5 is a block diagram illustrating a functional configuration of the CPU 154 included in the control unit 15 of the printer 10.

The CPU 154 functions as a scanning controller 154A, a printing controller 154B, a measuring controller 154C, a color measurer 154D, a calibrator 154E, and the like as illustrated in FIG. 5 by reading and executing various programs stored on the memory 153.

The scanning controller 154A outputs to the unit controller circuit 152 an instruction signal that indicates driving of the supply unit 11, the transport unit 12, and the carriage moving unit 14. Accordingly, the unit controller circuit 152 drives the roll drive motor of the supply unit 11 and supplies the medium A to the transport unit 12. The unit controller circuit 152 drives the transport motor of the transport unit 12 to transport a predetermined region of the medium A in the Y direction to a position on the platen 122 facing the carriage 13. The unit controller circuit 152 drives the carriage motor 142 of the carriage moving unit 14 to move the carriage 13 in the X direction.

The printing controller 154B outputs an instruction signal that indicates control of the printing unit 16 to the unit controller circuit 152 on the basis of, for example, the print data that is input from the external apparatus 20. When the instruction signal is output to the unit controller circuit 152 from the printing controller 154B, the unit controller circuit 152 outputs a printing control signal to the printing unit 16 to drive the piezoelectric element disposed in the nozzle and causes ink to be discharged to the medium A. When printing is performed, an image configured of a plurality of dots is printed on the medium A by alternately repeating a dot forming operation that moves the carriage 13 in the X direction and discharges ink from the printing unit 16 during the moving to form a dot and a transport operation that transports the medium A in the Y direction.

The measuring controller 154C performs a spectrometry process. Specifically, the measuring controller 154C outputs an instruction signal for controlling the light source 171A to the unit controller circuit 152 and causes light to be emitted from the light source 171A.

The measuring controller 154C reads a drive voltage for the electrostatic actuator 56 with respect to the wavelength of light transmitted through the wavelength-selective interference filter 5 from the V-λ data of the memory 153 and outputs an instruction signal to the unit controller circuit 152. Accordingly, the unit controller circuit 152 applies the drive voltage from the instruction signal to the wavelength-selective interference filter 5, and light of a desired transmitted wavelength is transmitted through the wavelength-selective interference filter 5.

The measuring controller 154C stores the detection signal in association with the voltage applied to the electrostatic actuator 56 (or the wavelength of light transmitted through the wavelength-selective interference filter 5 that corresponds to the voltage) on the memory 153.

The color measurer 154D measures the intensity of color in an area of measurement R on the basis of the intensity of light received with respect to light of a plurality of wavelengths obtained by the spectrometry process.

The calibrator 154E corrects (updates) the printing profile data on the basis of a color measurement result from the color measurer 154D.

Irradiation Area of Illumination Light

Next, the irradiation area of the illumination light when the illumination light passes through the integrator optical system 171B in the spectroscope 17 will be described on the basis of the drawings.

In the present embodiment, spectrometry is performed in accordance with a (0°: 45° x) geometrical optics condition defined by the color measurement standard (JIS Z 8722). Thus, light from the illumination optical system 171 is required to be incident at an angle of incidence of 10° or less on the medium A.

If the entire area of measurement R is irradiated with the illumination light from the light source by simply enlarging the area of light from the light source by using an enlarging lens or the like when the area of measurement R is changed in accordance with a change in the distance between the medium A and the spectroscope 17, light cannot be incident on the medium A at an angle of incidence of 10° or less. In addition, even though the irradiation area of the illumination light is large, a light intensity distribution in the area of irradiation is not uniform. Thus, measurement error occurs if the area of measurement R is moved. In addition, if an aperture is disposed on the optical axis of the light source to irradiate the medium A with the illumination light at a predefined angle of incidence (10° or less), the area of irradiation is small, and a light intensity distribution becomes non-uniform if the area of measurement R is moved and shifted from the area of irradiation.

Besides, it is considered that, for example, only a collimator lens is disposed at the rear of the light source to cause parallel light to be incident in the irradiation area of light at an angle of incidence of 0°. However, even in this case, a light intensity distribution is not uniform in the area of irradiation. Thus, measurement error occurs if the area of measurement R is moved.

Regarding this matter, the integrator optical system 171B including the pair of fly's eye lenses 171C and 171D and the condenser lens 171E is disposed in the present embodiment. In addition, various lenses in the integrator optical system 171B are designed so that the area of irradiation is irradiated with the illumination light in accordance with an allowable distance between the medium A and the spectroscope 17. Accordingly, a large area of irradiation can be irradiated with the illumination light having an approximately uniform intensity distribution compared with a configuration in which an enlarging lens is disposed, calibration using a spotlight by decreasing the diameter of a pencil of light by using an aperture, and a configuration in which a collimator lens is disposed.

Hereinafter, the integrator optical system 171B will be more specifically described.

Figure 6:
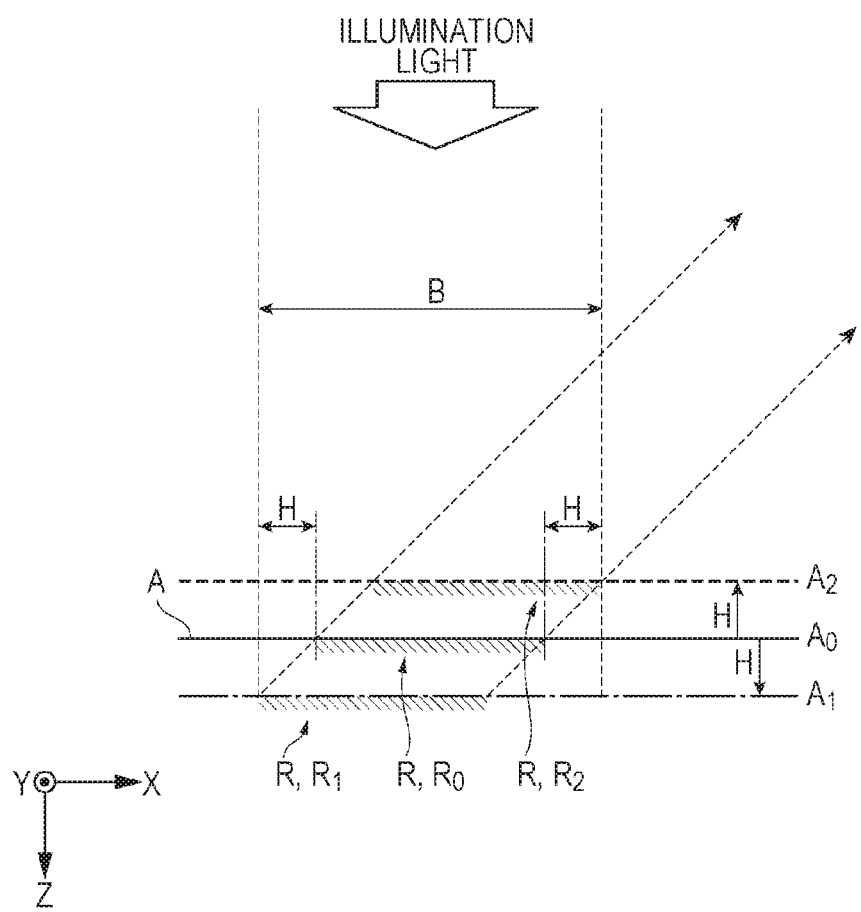
FIG. 6 is a diagram illustrating an area of measurement and an irradiation area of illumination light in accordance with a change in the distance between a medium and the spectroscope in the first embodiment.

FIG. 6 is a diagram illustrating the irradiation area of light irradiated from the illumination optical system 171 and a change in the area of measurement due to a change in the distance between the medium A and the spectroscope 17 in the present embodiment.

In FIG. 6, a predetermined reference distance $h_0$ is the distance between the medium A and the spectroscope 17 when there is no ripple or crease on the medium A, no distortion or the like occurs on the transport path of the medium A, and the carriage 13 is not displaced in the Z direction by, for example, bending of the carriage guide shaft 141 (when the medium A is positioned at a reference position $A_0$). When the medium A is positioned at the reference position $A_0$, the area of measurement (reference area of measurement $R_0$) in which light is received by the light receiver 172B is positioned on the optical axis of the light source 171A.

As illustrated in FIG. 6, the area of measurement R is moved to a +X side if the distance between the medium A and the spectroscope 17 is smaller than the reference distance $h_0$, and the area of measurement R is moved to a −X side if the distance between the medium A and the spectroscope 17 is larger than the reference distance $h_0$. An allowable distance range for the distance between the medium A and the spectroscope 17 is determined in order to normally perform the printing process with the printing unit and the spectrometry process using the spectroscope 17. That is, the printing process or the spectrometry process cannot be normally performed if the medium A is displaced in the Z direction by an allowable amount of change H (for example, H=1 mm) or more from the reference position $A_0$.

Therefore, in the present embodiment, an area of irradiation B that the integrator optical system 171B irradiates with light is set so that the area of measurement R is irradiated with approximately uniform illumination light when a distance h between the medium A and the spectroscope 17 is in the range of $h_0 \pm H$. That is, the irradiation area of the illumination light B in the present embodiment covers an area of measurement $R_1$ in which the distance between the medium A and the spectroscope 17 is larger by H than the reference distance $h_0$ and an area of measurement $R_2$ in which the distance is smaller by H than the reference distance $h_0$.

Light of an angle of incidence of 0° is reflected at an angle of reflection of 45° in the (0°: 45° x) color measurement standard. Therefore, if the distance h between the medium A and the spectroscope 17 is moved by Δh, so is the area of measurement R moved in the X direction by Δh. Thus, the irradiation area of the illumination light B is set to be larger than the reference area of measurement $R_0$ by the same or larger dimension than at least the allowable amount of change H to the ±X side.

If the area of irradiation B is excessively large, light that is reflected in a region other than the area of measurement R may be incident on the light receiving optical system 172 and may be received as stray light by the light receiver 172B. Therefore, as illustrated in FIG. 6, it is preferable to set the area of irradiation B to be larger than the reference area of measurement $R_0$ by the dimension H to the +X side and by the dimension H to the −X side. If the area of measurement R and the area of irradiation B have a circular shape, the area of irradiation B is a circular region that has a larger radius than the reference area of measurement $R_0$ by H around the reference area of measurement $R_0$.

The distance between the medium A and the spectroscope 17 means the distance between the medium A and an arbitrary position on the spectroscope 17 (for example, a casing thereof) along the optical axis of the illumination light.

The integrator optical system 171B includes the pair of fly's eye lenses 171C and 171D. Using the fly's eye lenses 171C and 171D allows an in-plane distribution of transmitted light to be approximately uniform.

As described heretofore, the integrator optical system 171B of the present embodiment irradiates the area of irradiation B, enlarged by the same or larger dimension than the allowable amount of change H to the ±X side around the reference area of measurement $R_0$, with illumination light having an approximately uniform in-plane intensity distribution. Accordingly, if the distance h between the medium A and the spectroscope 17 is in the range of $h_0 - H \leq h \leq h_0 + H$, the entire area of measurement R is irradiated with illumination light having an approximately uniform intensity distribution.

Effect of Present Embodiment

In the printer 10 of the present embodiment, the spectroscope 17 is disposed in the carriage 13, and the spectroscope 17 includes the illumination optical system 171 and the light receiving optical system 172. The illumination optical system 171 causes the illumination light emitted from the light source 171A to be incident on the integrator optical system 171B. The integrator optical system 171B ensures approximate uniformity of the in-plane intensity distribution of the illumination light and irradiates the medium A with the illumination light in the area of irradiation B that is larger by a dimension corresponding to the allowable amount of change H or more than the reference area of measurement $R_0$.

Thus, if the distance between the medium A and the spectroscope 17 is changed, the intensity distribution of the illumination light with which the area of measurement R is irradiated is approximately uniform provided that the amount of change is within the allowable amount of change H, and a decrease in measurement accuracy due to a change in the light intensity distribution can be suppressed.

In addition, while correction accuracy is decreased by influence from noise in a configuration that performs distance correction on the basis of the detection signal from the light receiver 172B, the present embodiment physically increases the irradiation area of the illumination light. Thus, spectrometry accuracy and colorimetry accuracy can be improved. In addition, since no operation processing is performed for distance correction on the basis of a signal value, processing is simplified.

The integrator optical system 171B is configured to include the fly's eye lenses 171C and 171D in the present embodiment. Using the fly's eye lenses 171C and 171D allows the area of irradiation to be irradiated with light having an approximately uniform in-plane intensity by a simple configuration. In addition, optical loss can be decreased compared with a case where a rod lens or the like is used.

The present embodiment uses wavelength-selective interference filter 5 that is a wavelength-selective Fabry-Pérot etalon element as the spectroscopy element. Thus, low cost and size reduction can be promoted compared with a case where other spectroscopy elements such as an AOTF and an LCTF are used, and the cost and size of the spectrometry device are decreased.

The wavelength-selective interference filter 5 displaces the movable portion 521 toward the fixed substrate and controls the dimension of the gap between the reflecting films 54 and 55 by controlling the voltage applied to the electrostatic actuator 56. The amount of bending is larger in the peripheral region of the reflecting films 54 and 55 than in the central region thereof. Thus, a slight shift occurs between the wavelength of light transmitted through the central region and the wavelength of light transmitted through the peripheral region. If the medium A is irradiated with a spotlight that has a high intensity in the central portion thereof and a low intensity in the peripheral portion thereof as in the related art, reflected light from the central portion of the spot light may be incident on the peripheral region of the reflecting films 54 and 55 when the distance between the medium A and the spectroscope 17 is changed. In this case, spectrometry accuracy is decreased because the intensity of light having a different wavelength from the measured wavelength is increased. Regarding this matter, as described above, the area of irradiation B is irradiated with light having an approximately uniform intensity distribution in the present embodiment. Thus, a decrease in measurement accuracy due to such characteristics of the wavelength-selective interference filter 5 can be suppressed, and high accuracy spectrometry can be performed.

In the present embodiment, the spectroscope 17 is mounted in the printer 10 that includes the printing unit 16 forming an image on the medium A and performs spectrometry on the medium A. The calibrator 154E updates the printing profile data on the basis of the reflectance in each measured wavelength and the intensity of color calculated from the spectrometry result.

In such a printer 10, as described above, high accuracy spectrometry can be performed on the color patches, and a high accuracy colorimetry process can be performed. Therefore, by updating the printing profile data on the basis of the color measurement result from the colorimetry process, the printing unit 16 can form an image in which the intensity of color desired by a user is reproduced with high accuracy.

Second Embodiment

Next, a second embodiment according to the invention will be described.

In the first embodiment, the integrator optical system 171B irradiates the predetermined area of irradiation B with the illumination light from the light source 171A and ensures approximate uniformity of the in-plane intensity distribution of the illumination light. In this case, while the area of measurement R can be irradiated with illumination light having an approximately uniform intensity distribution, a region other than the area of measurement R is also irradiated with the illumination light. Thus, measurement error may be caused by stray light.

Regarding this matter, the second embodiment is different from the first embodiment in that measurement error due to stray light is reduced by disposing a light pencil diameter changer that can change an opening diameter thereof.

Figure 7:
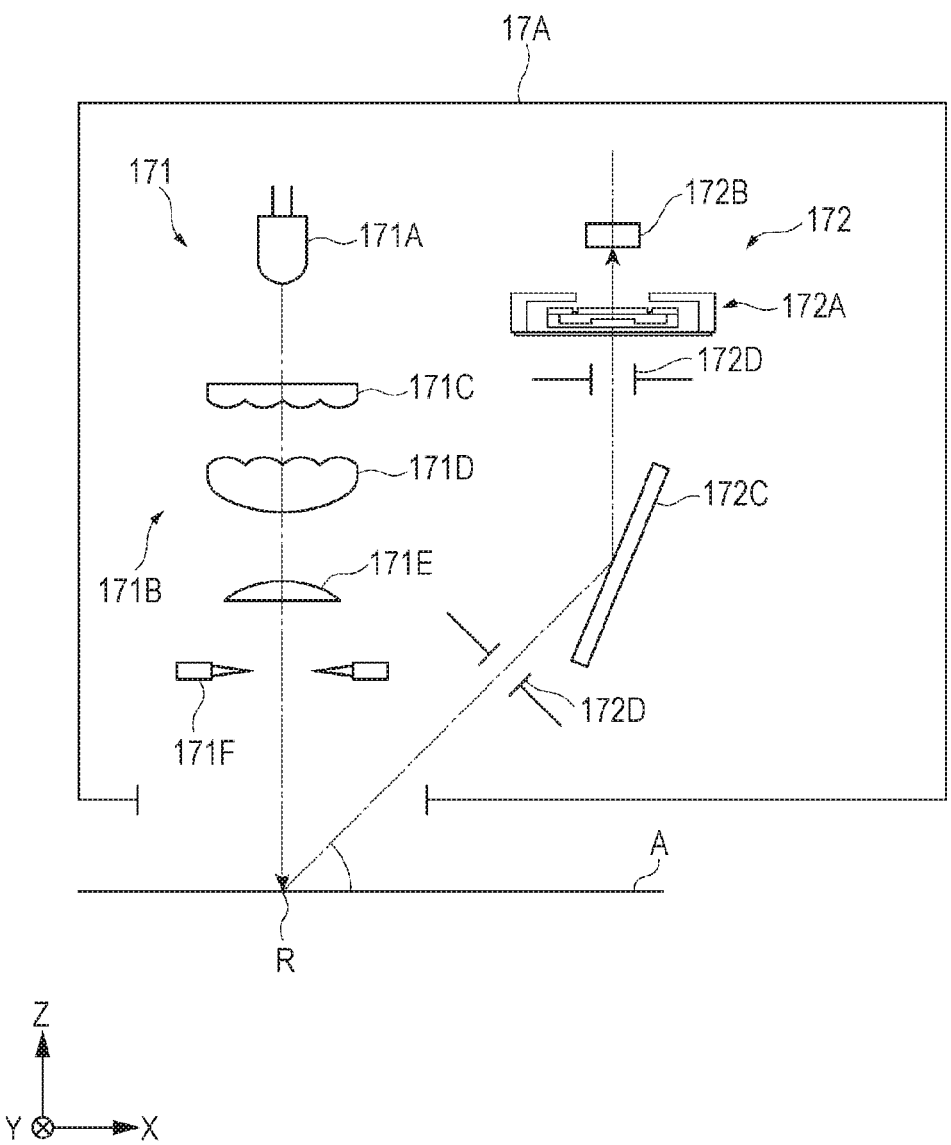
FIG. 7 is a diagram illustrating a schematic configuration of a spectroscope of a second embodiment.

FIG. 7 is a diagram illustrating a schematic configuration of a spectroscope 17A of the present embodiment. In the description below, the same configuration as in the first embodiment will be designated by the same reference sign, and a description thereof will not be provided or will be simplified.

In the spectroscope 17A of the present embodiment, a light pencil diameter changer 171F is disposed at the rear of the condenser lens 171E in the illumination optical system 171 as illustrated in FIG. 7. The light pencil diameter changer 171F is configured of, for example, an iris diaphragm and changes the diameter of a pencil of light from the integrator optical system 171B to a desired diameter of the pencil of light under control of the control unit 15.

The minimum value of the opening diameter of the light pencil diameter changer 171F is equal to a diametral dimension r of the area of measurement R (for example, 3 mm), and the maximum value thereof is equal to the dimension r+2H (for example, 5 mm) in which the area of measurement R can be covered when the distance between the medium A and the spectroscope 17A is changed by the allowable amount of change H (for example, 1 mm).

In the present embodiment, the opening diameter of the light pencil diameter changer 171F is controlled to be the minimum value (r) when the distance between the medium A and the spectroscope 17A is equal to the reference distance $h_0$ (when the medium A is positioned at the reference position $A_0$).

When the distance between the medium A and the spectroscope 17A is changed from the reference distance $h_0$, the opening diameter of the light pencil diameter changer 171F is increased in accordance with the amount of change $\Delta h$ (r+2$\Delta h$). When the amount of change $\Delta h$ is equal to the allowable amount of change H, the opening diameter of the light pencil diameter changer 171F is controlled to be the maximum value (r+2H).

Functional Configuration of CPU of Control Unit

Figure 8:
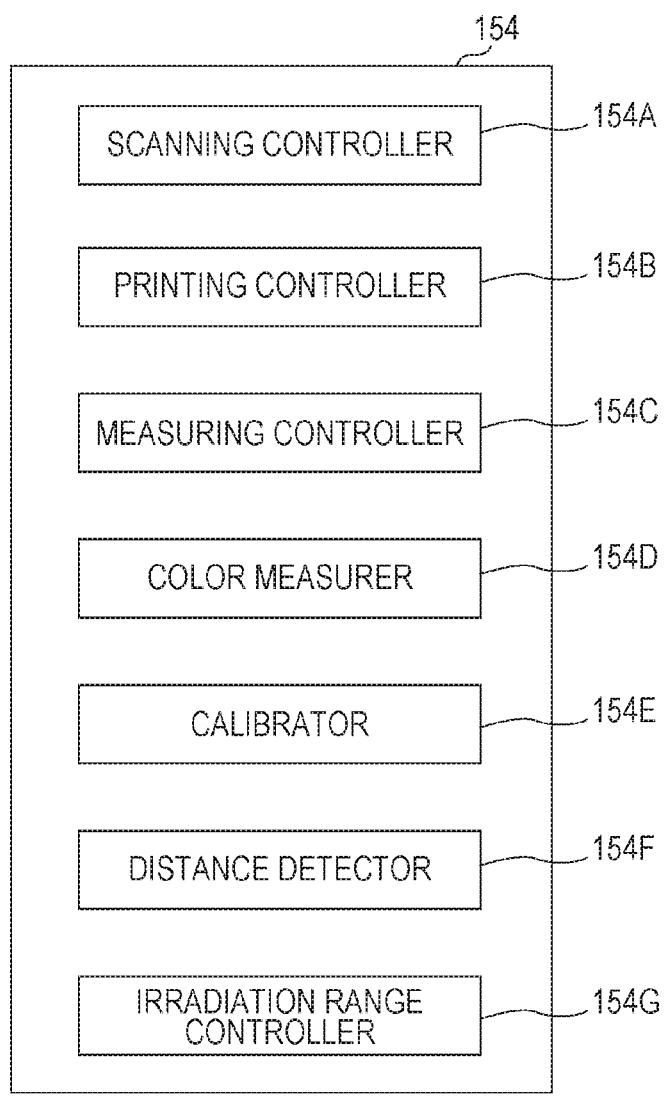
FIG. 8 is a block diagram illustrating a functional configuration of a CPU in a control unit of a printer of the second embodiment.

FIG. 8 is a diagram illustrating a functional configuration of the CPU 154 in the present embodiment.

As illustrated in FIG. 8, the CPU 154 of the present embodiment further functions as a distance detector 154F and an irradiation area controller 154G by reading and executing programs recorded on the memory 153.

The distance detector 154F detects the amount of distance change $\Delta h$ between the medium A and the spectroscope 17A.

As a method for detecting a change in the distance between the medium A and the spectroscope 17A, for example, spectrometry is performed on a white region of the medium A, and a measured value is obtained. The measured value may be a signal value of the detection signal from the light receiver 172B or may be the intensity of light received or the reflectance calculated on the basis of the signal value. Distance data in which the amount of distance change $\Delta h$ is recorded in correspondence with the measured value is stored on the memory 153, and the distance detector 154F detects the distance between the medium A and the spectroscope 17A (amount of distance change $\Delta h$) on the basis of the measured value obtained and the distance data. The white region preferably has a known reflectance. While the white region is illustrated herein, the present embodiment is not limited to this illustration. Any reference region having a known reflectance may be used.

In the present embodiment, the area of irradiation B is irradiated with illumination light having an approximately uniform intensity distribution as in the first embodiment. Therefore, when a part of the area of measurement R is deviated from the irradiation area of the illumination light B, a light intensity change is increased compared with a case where, for example, irradiation uses a spotlight that has a high intensity in the central portion thereof and a low intensity in the peripheral portion thereof. Accordingly, when spectrometry is performed on the white region having a known reflectance as described above, the intensity of light received when a part of the area of measurement R is deviated from the irradiation area of the illumination light B is significantly decreased from the reference intensity of light received when the area of measurement R resides in the area of irradiation B. Thus, by monitoring the measured value based on the intensity of received light, the amount of distance change $\Delta h$ between the medium A and the spectroscope 17A can be easily detected as described above.

In the spectrometry performed on the white region, the spectrometry, for example, may be performed in a plurality of wavelengths in the visible light region or may be performed in a predetermined preset wavelength. In the case of performing spectrometry in a plurality of wavelengths, plural pieces of distance data (amount of distance change Δh) corresponding to the plurality of wavelengths may be stored on the memory 153.

In detecting the amount of distance change Δh on the basis of the measured value in the plurality of wavelengths, distance detection in which noise is removed can be performed by determining whether the difference value between the amount of distance change Δh detected with respect to the measured value in each wavelength is smaller than a predetermined threshold. For example, each distance data is obtained with respect to the measured value in each wavelength. Data that has a difference with another distance data greater than or equal to the threshold is regarded as data on which noise is superimposed and is removed from the pieces of distance data, and the average of the remaining distance data is calculated to detect the amount of distance change Δh between the medium A and the spectroscope 17A.

The distance detector 154F may perform error detection by determining whether the amount of distance change Δh detected is within the allowable amount of change H. That is, the distance detector 154F determines that the printing process performed by the printing unit 16 and the spectrometry process using the spectroscope 17A cannot be normally performed when the amount of distance change Δh is larger than the allowable amount of change H and outputs error.

The irradiation area controller 154G controls the light pencil diameter changer 171F to enlarge or reduce the irradiation area of the illumination light B on the basis of the amount of distance change Δh detected by the distance detector 154F.

Spectroscopy Method

Next, a spectroscopy method in the printer 10 of the present embodiment will be described on the basis of the drawings.

Figure 9:
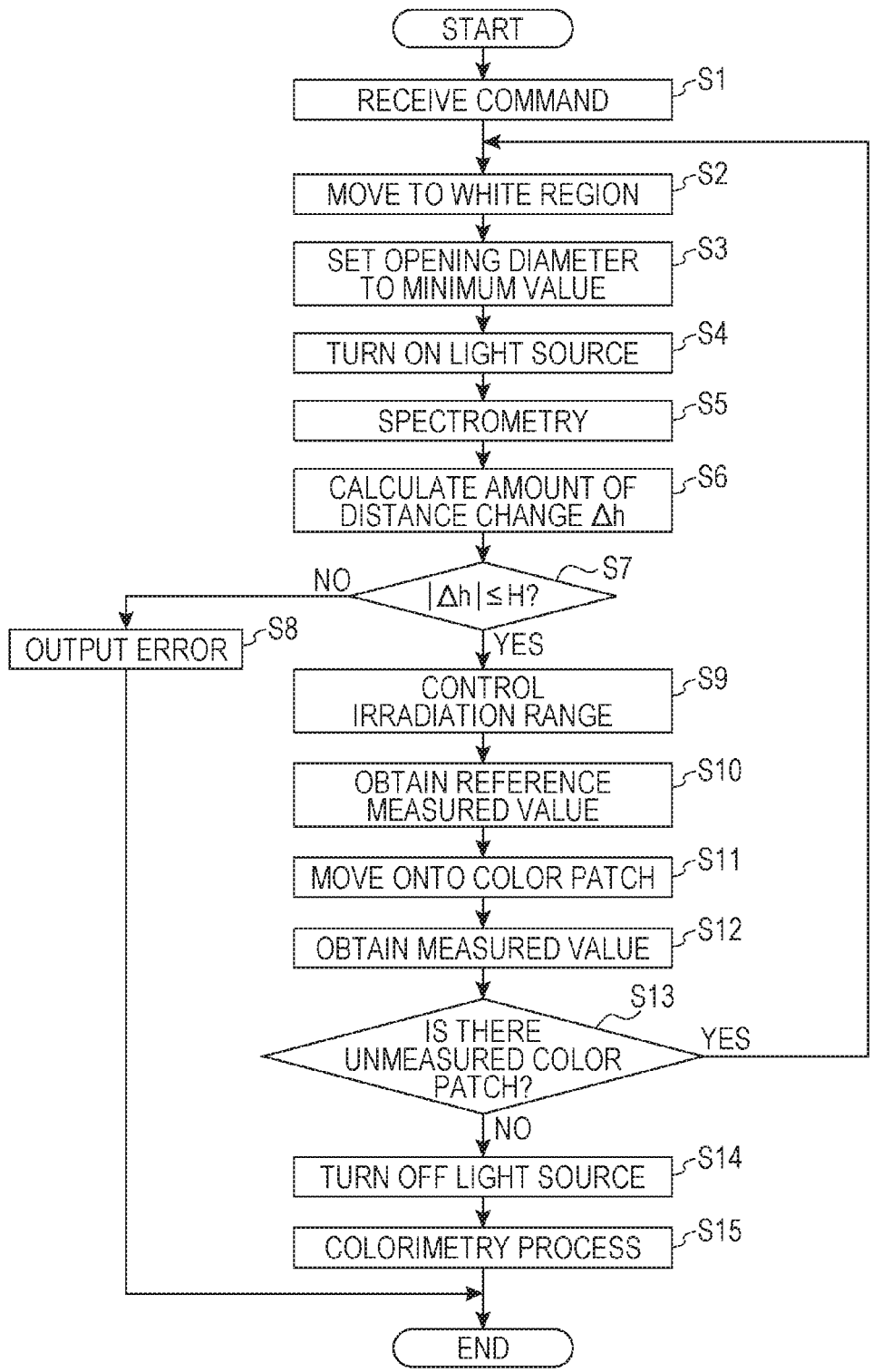
FIG. 9 is a flowchart illustrating a spectrometry method for the printer of the second embodiment.

FIG. 9 is a flowchart illustrating the spectroscopy method in the printer 10.

As a spectrometry process performed by the printer 10, for example, an example in which the spectrometry process is performed on a plurality of color patches printed by the printing unit 16 will be described. The white region (reference region having a known reflectance) is assumed to be disposed to be adjacent to each color patch.

In the spectrometry process of the present example, an instruction that indicates performing of the spectrometry process is received from, for example, user operation or input from the external apparatus 20 (Step S1). When the instruction is received in Step S1, the scanning controller 154A controls the transport unit 12 and the carriage moving unit 14 to transport the medium A in the Y direction so that the carriage 13 is positioned on a line in which the color patches are arranged and, furthermore, to move the carriage to the white region that is adjacent to a color patch (Step S2).

Then, the irradiation area controller 154G controls the light pencil diameter changer 171F to set the opening diameter of the light pencil diameter changer 171F to the minimum value (Step S3). The measuring controller 154C turns on the light source 171A (Step S4). Accordingly, the medium A is irradiated with the illumination light of the same size as the area of measurement R and having an approximately uniform in-plane intensity distribution from the illumination optical system 171.

Next, the control unit 15 performs the spectrometry process on the white region (Step S5).

In the spectrometry process, the measuring controller 154C measures the measured value (light intensity) in, for example, 16 measured wavelength bands in the visible light region from 400 nm to 700 nm at an interval of 20 nm by sequentially switching the drive voltage for the electrostatic actuator 56 of the wavelength-selective interference filter 5 on the basis of the V-λ data stored on the memory 153.

Then, the distance detector 154F obtains the distance data in each measured wavelength on the basis of the measured value obtained in Step S5 and the distance data recorded on the memory 153 and detects the amount of distance change Δh between the medium A and the spectroscope 17A (Step S6). As a method for distance detection, for example, data that has a large difference value with another distance data is removed from the pieces of distance data, and the average value of the remaining data is calculated as distance as described above.

Then, the distance detector 154F determines whether the amount of distance change Δh calculated is within the allowable amount of change H (Step S7). If Step S7 is determined as "No", the distance between the medium A and the spectroscope 17A is excessively large. Thus, error is output (Step S8).

Meanwhile, if Step S7 is determined as "Yes", the irradiation area controller 154G controls the opening diameter of the light pencil diameter changer 171F (Step S9). That is, the irradiation area controller 154G increases the area of irradiation B by increasing the opening diameter of the light pencil diameter changer 171F by the amount of distance change Δh. If the amount of distance change Δh is zero, the medium A is positioned at the reference position $A_0$. Thus, the opening diameter of the light pencil diameter changer 171F is maintained at the minimum value. If an iris diaphragm that increases the diametral dimension from the center of the opening thereof is used as the light pencil diameter changer 171F, the radius of the opening diameter thereof is required to be increased by Δh. Thus, the opening diameter (diameter) is increased by 2×Δh.

Then, the control unit 15 performs the spectrometry process on the white region and obtains a reference measured value (Step S10). In Step S10, the measuring controller 154C performs the same spectrometry process as in Step S5 on the white region and obtains the measured value in each measured wavelength as the reference measured value.

Next, the scanning controller 154A controls the transport unit 12 and the carriage moving unit 14 to move the carriage 13 so that the area of measurement R is positioned on the color patch adjacent to the white region (Step S11).

Then, the measuring controller 154C performs the spectrometry process on the color patch and obtains the measured value in each wavelength by performing the same process as in Step S5 (Step S12).

Then, the measuring controller 154C determines whether there is an unmeasured color patch (Step S13).

If Step S13 is determined as "Yes", the process returns to Step S2, and the scanning controller 154A controls the transport unit 12 and the carriage moving unit 14 to move the area of measurement R in the spectroscope 17A to the white region that is adjacent to a subsequent color patch, sets the area of irradiation B to an appropriate area, and performs the spectrometry process on the color patch. The process of obtaining the reference measured value from the white region in Step S10 may not be performed when spectrometry is performed on the second or later color patch.

If Step S13 is determined as "No", the measuring controller 154C turns off the light source 171A (Step S14).

Then, the control unit 15 performs the colorimetry process (Step S15). Specifically, the color measurer 154D calculates a reflectance in each measured wavelength on the basis of the measured value in each measured wavelength and the reference measured value, calculates a colorimetric value (for example, an XYZ value or an L*a*b* value) on the basis of the calculated reflectance, and stores the colorimetric value on the memory 153. The calibrator 154E updates the printing profile data stored on the memory 153 on the basis of the color measurement result for each color patch.

Effect of Present Embodiment

In the present embodiment, the light pencil diameter changer 171F is disposed to adjust the diameter of the light pencil of the illumination light with which the medium A is irradiated, in accordance with the distance between the medium A and the spectroscope 17A.

Thus, even if the distance between the medium A and the spectroscope 17A is changed from the reference distance, the area of measurement R can be irradiated with illumination light having an approximately uniform intensity distribution as in the first embodiment by changing the irradiation area of the illumination light B in accordance with the distance change, and measurement accuracy can be improved.

In addition, since the area of irradiation B is not excessively increased, the problem that the illumination light with which a region other than the area of measurement R is irradiated is reflected and incident on the light receiving optical system 172 can be prevented, and high accuracy measurement can be performed by reducing stray light.

In the present embodiment, the distance detector 154F detects the amount of distance change Δh between the medium A and the spectroscope 17A and outputs error if the amount of distance change Δh exceeds the allowable amount of change H. Accordingly, the problem that the printing process or the spectrometry process is performed even though the amount of distance change Δh is greater than or equal to the allowable amount of change H can be avoided.

Other Embodiments

The invention is not limited to each embodiment described above. Modifications, improvements, and configurations obtained by an appropriate combination of each embodiment to the extent capable of achieving the advantage of the invention are to be included in the invention.

While, for example, above each embodiment illustrates using the pair of fly's eye lenses 171C and 171D as the integrator optical system 171B, the invention is not limited to this illustration. For example, a rod lens may be used to make a light intensity distribution approximately uniform. When the rod lens is used, a light component of the light from the light source 171A that is not incident on the rod lens cannot be incident on the medium A. Thus, the efficiency in use of light is decreased. In this case, the efficiency in use of light can be improved by using a rod lens array in which a plurality of rod lenses is arranged into an array.

In the first embodiment, the control unit 15 may determine whether the amount of distance change between the medium A and the spectroscope 17 is larger than or equal to the allowable amount of change on the basis of the detection signal from the light receiver 172B and, if the amount of distance change is larger than or equal to the allowable amount of change, may output error.

That is, in the first embodiment, the area of irradiation B is set to be larger than the reference area of measurement $R_0$ by the dimension H to the +X side and by the dimension H to the −X side. Therefore, if the distance between the medium A and the spectroscope 17 is changed by the allowable amount of change H or more, at least a part of the area of measurement R is deviated from the area of irradiation B. If a part of the area of measurement R is deviated from the area of irradiation B, the amount of change in the light intensity is increased compared with a case where a spotlight in which the intensity thereof is smaller in the peripheral portion thereof than in the central portion thereof is used, because the area of irradiation B, in the present embodiment, is irradiated with illumination light having an approximately uniform in-plane intensity distribution as described above. That is, monitoring the measured value during spectrometry allows deviation of the area of measurement R from the area of irradiation B, that is, a change in the distance between the medium A and the spectroscope 17 by the allowable amount of change H or more, to be accurately detected.

In the second embodiment, the distance detector 154F performs spectrometry on the reference region such as the white region and detects the amount of distance change Δh between the medium A and the spectroscope 17A on the basis of the measured value.

Regarding this matter, a distance sensor that detects the distance between the medium A and the spectroscope 17A may be separately disposed. In this case, the irradiation area controller 154G may control the light pencil diameter changer 171F on the basis of the distance measured by the distance sensor.

While the distance detector 154F detects the amount of change in the distance between the medium A and the spectroscope 17A in the second embodiment, the invention is not limited to this.

For example, the opening diameter of the light pencil diameter changer 171F is set to the minimum value (r) before spectrometry is performed. Then, the area of measurement R is moved to a measurement target (color patch or white region), and the irradiation area controller 154G gradually increases the opening diameter of the light pencil diameter changer 171F and monitors the detection signal from the light receiver 172B to determine whether the signal value of the detection signal is increased. That is, if the signal value is increased when the opening diameter is gradually increased, this means that the entire area of measurement R is not irradiated with the illumination light. The signal value does not increase after the entire area of measurement R is irradiated with the illumination light even if the area of irradiation B is increased by increasing the opening diameter of the light pencil diameter changer 171F. Thus, increasing of the opening diameter is stopped at the timing when the signal value stops increasing while the opening diameter of the light pencil diameter changer 171F is gradually increased.

Even after the entire area of measurement R is irradiated with the illumination light, the signal value may be increased if the opening diameter of the light pencil diameter changer 171F is increased because a stray light component is received by the light receiver 172B. However, in this case, the rate of increase of the signal value is sufficiently smaller than the rate of increase of the signal value accompanied by increasing of the opening diameter of the light pencil diameter changer 171F when a part of the area of measurement R is not included in the area of irradiation B. Therefore, determining the rate of increase of the signal value allows determination of whether the entire area of measurement R is irradiated with the illumination light.

While the second embodiment illustrates an iris diaphragm as the light pencil diameter changer 171F, the invention is not limited to this.

Figure 10:
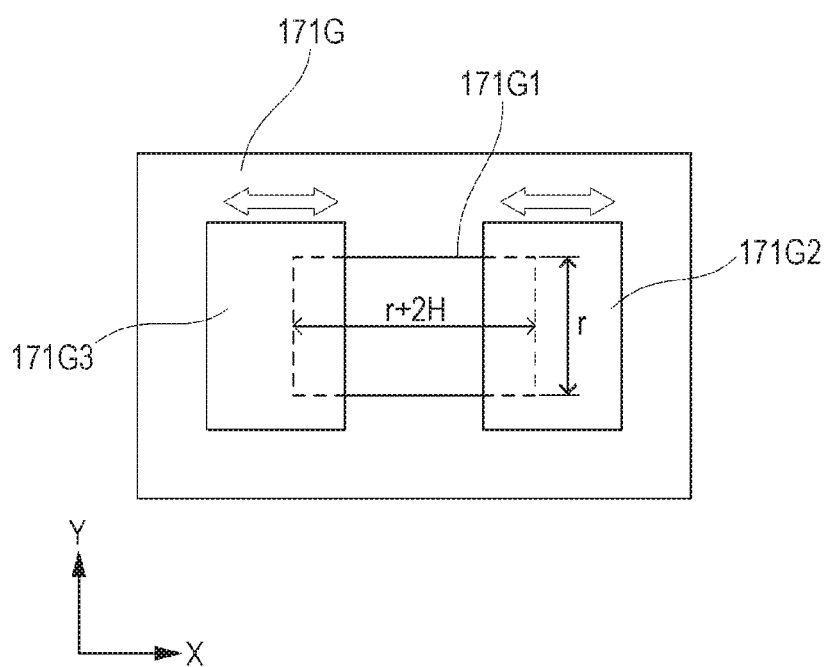
FIG. 10 is a diagram illustrating a configuration of a light pencil diameter changer in another embodiment.

For example, the light pencil diameter changer may be configured as illustrated in FIG. 10.

FIG. 10 is a diagram illustrating a configuration of a light pencil diameter changer in another embodiment.

As illustrated in FIG. 10, a light pencil diameter changer 171G includes a slit hole 171G1 in the X direction, a first occluding portion 171G2 that can occlude a part of the slit hole 171G1 on the +X side, and a second occluding portion 171G3 that can occlude a part of the slit hole 171G1 on the −X side.

The width dimension of the slit hole 171G1 in the Y direction is formed to be the same as the diametral dimension r of the area of measurement R, and the dimension thereof in the X direction is formed to be larger than or equal to r+2H given that the allowable amount of change is H (FIG. 10 illustrates the dimension in the X direction as r+2H).

The first occluding portion 171G2 and the second occluding portion 171G3 are configured to be movable in the X direction and are moved in the X direction under control of the irradiation area controller 154G.

Specifically, as illustrated in FIG. 10, the first occluding portion 171G2 occludes a +X side end portion of the slit hole 171G1 by the allowable amount of change H in the initial state, and the second occluding portion 171G3 also occludes a −X side end portion of the slit hole 171G1 by the allowable amount of change H in the initial state. The irradiation area controller 154G, if the distance detector 154F detects the amount of distance change Δh, moves the first occluding portion 171G2 to the +X side by the amount of distance change Δh and moves the second occluding portion 171G3 to the −X side by the amount of distance change Δh.

Using such a light pencil diameter changer 171G allows each of the first occluding portion 171G2 and the second occluding portion 171G3 to be individually controlled. For example, only the first occluding portion 171G2 may be moved if the distance between the medium A and the spectroscope 17A is decreased, and only the second occluding portion 171G3 may be moved if the distance between the medium A and the spectroscope 17A is increased.

The first occluding portion 171G2 and the second occluding portion 171G3 may be moved in the same direction. For example, each of the first occluding portion 171G2 and the second occluding portion 171G3 may be moved in the +X direction by the amount of distance change Δh if the distance between the medium A and the spectroscope 17A is decreased, and each of the first occluding portion 171G2 and the second occluding portion 171G3 may be moved in the −X direction by the amount of distance change Δh if the distance between the medium A and the spectroscope 17A is increased.

While the integrator optical system 171B irradiates with illumination light the area of irradiation B that is larger than the reference area of measurement $R_0$ by the dimension H to the +X side and by the dimension H to the −X side in the first embodiment, the invention is not limited to this. A larger area may be irradiated with the illumination light. In this case, for example, more apertures may be disposed in the light receiving optical system 172 in order to prevent the problem that reflective light that is reflected in a region other than the area of measurement R is detected as stray light.

While above each embodiment illustrates a configuration in which the unit controller circuit 152 is disposed in the control unit 15, a control unit may be disposed in each unit separately from the control unit 15 as above. For example, a filter controller circuit that controls the wavelength-selective interference filter 5 and a light reception controller circuit that controls the light receiver 172B may be disposed in the spectroscope 17. In addition, a microcomputer and a memory that stores the V-λ data may be incorporated into the spectroscope 17, and the microcomputer may function as the measuring controller 154C.

While above each embodiment illustrates the printing unit 16 as an ink jet type that discharges ink supplied from the ink tank by driving the piezoelectric element, the invention is not limited to this. For example, the printing unit 16 may discharge ink by generating an air bubble by using a heater in the ink or may discharge ink by using an ultrasonic vibrator.

This is not limited to an ink jet type and, for example, can be applied to a printer of any printing type such as a thermal printer using thermal transfer, a laser printer, and a dot impact printer.

While above each embodiment illustrates the wavelength-selective interference filter 5 as a light transmitting type that transmits light of a wavelength corresponding to the gap G between the reflecting films 54 and 55 from incident light, the invention is not limited to this. For example, a light reflecting wavelength-selective interference filter that reflects light of a wavelength corresponding to the gap G between the reflecting films 54 and 55 may be used. In addition, other types of wavelength-selective filters may be used.

While the above embodiment illustrates the spectroscopy device 172A in which the wavelength-selective interference filter 5 is accommodated in the casing 6, for example, the wavelength-selective interference filter 5 may be directly disposed in the spectroscope 17.

While the wavelength-selective interference filter 5 is illustrated as a spectroscopy element, the invention is not limited to this. For example, a grating, an AOTF, or an LCTF may be used as a spectroscopy element.

While above each embodiment illustrates a configuration (post-dispersive spectroscopy) in which the spectroscopy device 172A including the wavelength-selective interference filter 5 is disposed in the light receiving optical system 172, the invention is not limited to this.

For example, the wavelength-selective interference filter 5 or the spectroscopy device 172A including the wavelength-selective interference filter 5 may be arranged in the illumination optical system 171, and the medium A may be irradiated with light that is spectroscopically analyzed by the wavelength-selective interference filter 5 (pre-dispersive spectroscopy).

While above each embodiment illustrates the printer 10 that includes the spectrometry device, the invention is not limited to this. For example, the spectrometry device may not include an image forming unit and perform only the colorimetry process on the medium A. The spectrometry device of the invention may be incorporated into, for example, a quality inspecting apparatus that inspects the quality of a printed matter manufactured in a factory or the like, or besides, the spectrometry device of the invention may be incorporated into any apparatus.

While the spectroscope 17 (17A) is illustrated by a configuration example in which the medium A is irradiated with light of the light source 171A in the direction of a line normal to the medium A and light reflected by the medium A at 45° is incident on the wavelength-selective interference filter 5, the invention is not limited to this.

For example, light may be incident on the surface of the medium A at an angle of 45°, and the light receiver 172B may receive light that is reflected by the medium A in the direction of a line normal to the light receiver 172B through the wavelength-selective interference filter 5. In this case, the integrator optical system 171B irradiates with illumination light the area of irradiation B that is increased by $2^{1/2} \times H$ to the ±X side from the reference area of measurement $R_0$ given that the allowable amount of change is H.

While the light receiver 172B receives light reflected by the medium A at 45° through the wavelength-selective interference filter 5, the light receiver 172B may receive light that is reflected at an angle other than 45° such as 30°. That is, the angle of the optical axis of the light receiver 172B and the wavelength-selective interference filter 5 may be set so that the light receiver 172B does not receive light that is reflected by the medium A in a specular manner. For example, if light reflected at an angle of reflection of 30° is incident on the light receiving optical system 172, the integrator optical system 171B may irradiate with illumination light the area of irradiation B that is increased by $2 \times 3^{1/2} \times H$ to the ±X side from the reference area of measurement $R_0$ given that the allowable amount of change is H.

Besides, a specific structure in embodying the invention may be configured by appropriately combining above each embodiment and the modification examples to the extent capable of achieving the advantage of the invention and may be appropriately changed to other structures and the like.

The entire disclosure of Japanese Patent Application No. 2015-067228 filed on Mar. 27, 2015 is expressly incorporated by reference herein.

What is claimed is:

1. A spectrometry device comprising:
   a spectroscope including
   a light source that emits light,
   an integrator optical system that irradiates a predetermined irradiation area of a measurement target with the light from the light source, the light reflecting off of the measurement target so as to generate reflection light,
   a spectroscopy element on which the reflection light from the measurement target is incident, the reflection light having a reflection light optical axis, the spectroscopy element spectroscopically analyzing the reflection light so as to generate spectroscopic light,
   a light receiver that receives the spectroscopic light from the spectroscopy element, and
   a light pencil diameter changer that receives the light from the light source which has passed through the integrator optical system and that is configured to change a diameter of the light, the light pencil diameter changer being located off of the reflection light optical axis,
   wherein the predetermined irradiation area includes a measurement reference area,
   the predetermined irradiation area is larger than the measurement reference area by at least a dimension corresponding to an allowable change amount in a distance between the measurement target and the spectroscope,
   the measurement reference area is an actual measurement area in which spectrometry using the spectroscope is performed when the distance between the measurement target and the spectroscope is a reference distance, and
   wherein the light pencil diameter changer is configured to change the diameter of the light according to the distance between the measurement target and the spectroscope.

2. The spectrometry device according to claim 1, wherein the integrator optical system includes a fly's eye lens.

3. The spectrometry device according to claim 1, wherein the spectroscopy element is a wavelength-selective Fabry-Pérot etalon element.

4. An image forming apparatus comprising:
   the spectrometry device according to claim 1; and
   an image forming unit that forms an image on an image formation target.

5. An image forming apparatus comprising:
   the spectrometry device according to claim 2; and
   an image forming unit that forms an image on an image formation target.

6. An image forming apparatus comprising:
   the spectrometry device according to claim 3; and
   an image forming unit that forms an image on an image formation target.

* * * * *